12/30/86 XR 4,633,421

United States Patent [19]

Watson, Jr. et al.

[11] Patent Number: 4,633,421

[45] Date of Patent: Dec. 30, 1986

[54] METHOD FOR TRANSPOSING TIME MEASUREMENTS FROM ONE TIME FRAME TO ANOTHER

[75] Inventors: Charles W. Watson, Jr., North Wales, Pa.; Christopher M. Siegl, Beltsville, Md.

[73] Assignee: General Signal Corporation, Stamford, Conn.

[21] Appl. No.: 565,087

[22] Filed: Dec. 23, 1983

[51] Int. Cl.[4] .................... G04F 15/46; G04C 11/02; G08C 15/08; H04L 7/02

[52] U.S. Cl. .................... 364/569; 340/870.14; 358/149; 375/107; 368/47; 368/55

[58] Field of Search .................... 358/149; 375/107; 340/870.14; 364/569; 368/47, 55

[56] References Cited

U.S. PATENT DOCUMENTS

| | | | |
|---|---|---|---|
| 3,424,866 | 1/1969 | Hathaway | 358/149 |
| 3,962,634 | 6/1976 | Russo | 358/149 X |
| 4,117,661 | 10/1978 | Bryant, Jr. | 340/825.26 X |
| 4,165,459 | 8/1979 | Curtice | 364/569 X |
| 4,170,776 | 10/1979 | MacDoran | 343/458 |
| 4,218,705 | 8/1980 | Inaba et al. | 358/149 X |
| 4,234,958 | 11/1980 | Pipes et al. | 375/107 |
| 4,464,679 | 8/1984 | Wargo | 358/149 X |
| 4,473,889 | 9/1984 | Ross | 364/900 |

OTHER PUBLICATIONS

National Bureau of Standards (NBS) Technical Note 695, May 1977.

King, Charles J. "Sequence of Events Recording System" *IEEE Transactions on Power Apparatus and Systems*, vol. Pas 100, No. 9, Sep. 1981, pp. 4250–4254.

*Primary Examiner*—Parshotam S. Lall
*Assistant Examiner*—Joseph L. Dixon
*Attorney, Agent, or Firm*—Harold Huberfeld; William G. Miller, Jr.

[57] ABSTRACT

A method for transposing the time of an event as read at a remote station with one clock to the time frame of another clock at a master station when the clocks are not synchronized and are of insufficient accuracy to provide measurements to within a few microseconds relative to other time measurements which are likewise transposed to refer to the master clock. A list of TV line 10 synch pulse times are maintained at the master for a specific number of recent line 10 pulses. Along with the time reading for the event, the line 10 synch pulse time as read at the remote is sent to the master. The list of line 10 synch times maintained at the master is examined to find the time by the master clock for the same line 10 and the difference between the time by the remote clock and the time by the master clock is used as an indication of the time correction factor to be applied for the transposition. The time correction factor is compensated for the difference in propagation time for the TV signal transmission to the master as compared to the remote. The transposed time reading is compared to other transposed readings obtained from other remote stations to either determine the sequence of several events at the different remotes or to obtain a measure of quantities such as voltage phase angle or the position of a fault. Updating of the time correction factors is provided to compensate for drift of the clocks.

5 Claims, 2 Drawing Figures

METHOD FOR TRANSPOSING TIME MEASUREMENTS FROM ONE TIME FRAME TO ANOTHER

BACKGROUND OF THE INVENTION

This invention relates to time measurement and is particularly concerned with the transposition of a time measurement from one time frame to another as may be required in a process monitoring and control system carried out by means of a stored program, digital data acquisition and control system which utilizes a master station and a number of remote stations. More particularly, this invention relates to a method for accurately determining the time between events at locations remote from each other or for ordering the time sequence in which the events occur when there are no synchronized clocks available at the separate locations for accurately time tagging the events in accordance with a single time frame.

In the past, the correlation or measurement of time to an accuracy of a few microseconds has required expensive atomic clocks. In addition to the expense of the atomic clocks there is the added expense of maintaining their accuracy by using either an expansive periodic setting service which involves portable standards or the use of the television line 10 synch pulses as a means for setting the clocks.

The use of line 10 synch pulses is fully described in NBS TECHNICAL NOTE 695 published May 1977. That method consists of noting the clocks reading at predetermined times of day. Then at a later date when the NBS publishes the times for those lines as determined from their standard, the clock being checked can be adjusted to take into account the errors. These time corrections are, however, not made in real time as is the method of the present invention. In addition the NBS system does not provide real time updating as is needed for power systems such as those with which this invention is concerned. This method also requires the use of a gross standard such as WWVB.

Other systems have used the WWVB time standard which because of its low bandwidth gives accuracies of about 1 ms.

Still others systems have utilized measurements at both a master location and at remote locations which refer all time measurements to the master clock by indirectly measuring transit time to the remote locations and back, as is fully described by coworkers of mine in U.S. patent application Ser. Nos. 301,349 now abandoned and 301,350 filed Sept. 11, 1981 now U.S. Pat. No. 4,473,889.

Since the most important aspect of the problem is the accuracy of the timing of each event relative to a private master clock and not the exact time of day relative to a master clock at Greenwich or to the earth's rotation, highly accurate clocks are not necessarily a necessity. It is, therefore, desirable to eliminate the expense and complexity of precision clocks at each remote unit while maintaining high overall accuracy of correlation. Thus, it is an object of this invention to use medium accuracy clocks at both master and remote locations in a way which will provide highly accurate measurments of time differences between events at different locations or for the time sequential ordering of such events with compensation for the invariant differences in time as read by the clocks as well as for the different rates at which the clocks drift with time.

It is also an object of this invention to make possible simplified measurements of voltage phase angles in a power transmission and distribution systems with respect to a common swing bus by making highly accurate measurements of the zero crossings of the voltage wave form at various buses in the system.

Also, it is an object of this invention to make possible the simplified measurement of the location of a fault by simply measuring the time at which a wave front representing the fault current arrives at the two ends of the transmission line in which the fault has occurred.

SUMMARY OF THE INVENTION

In accordance with this invention there is provided a method for correcting the time tag associated with an event detected at a first location, such as a remote station, in a digital data acquisition system having a master station at a second location connected to receive data from said remote station. The time tag represents the data gathered at the remote stations indicating the time of occurrence of the event of interest as obtained by reference to an unsynchronized clock at the remote station where the occurrence of the event is detected, and the correction refers that time tag to time as kept by a clock at the master station, to make possible a time ordering of events at different remote stations or the measurement of the time difference between events.

This method includes the maintainence of a list of the times for line 10 synch pulses as obtained by reception from a single television station. Those times are determined from the master clock for a predetermined number of line 10 synch pulses previous to the most recent one received.

During periods (n) there is produced at the remote stations a signal constituting a message incorporating as a first signal the time tag, Tr(E)(n), for the event information requested, and as a second signal the line 10 synch time, Tr(S)(n), for a line 10 synch pulse having some fixed time relationship to the event, such as occurring just prior to the event.

A third signal, Td, is produced to represent the difference in propagation time from the television broadcast tower to the remote station as compared with the master station.

At each period a time correction factor, TCF(n), is calculated as a function of the second and third signals in accordance with the equation:

$$TCF(n) = Tm(S)(n) - Tr(S)(n) - Td,$$

where Tm(S)(n) is the time established from said list for the same line 10 synch pulse identified by the signal TR(S)(n), said time Tm(S)(n) being identified on said list as that one which causes the resulting correction factor, TCF(n), to deviate from the previous correction factor, TCF(n−1), by a minimum as compared with the correction factors corresponding to the other times on said list.

There is periodic updating of the correction factor, TCF(n), to compensate for the drift of the clocks at the remote stations with reference to the master station.

By summing for each event the time correction factor and the first signal, representing the time tag Tr(E)(n), there is produced a signal representing the correct timing of the event with reference to the master clock.

The correct timing signal for each event is recorded to provide a basis for time ordering the sequence of events or, where desired, to provide a measure of the time difference between events.

DESCRIPTION OF THE PREFERRED EMBODIMENT

Figure 1:
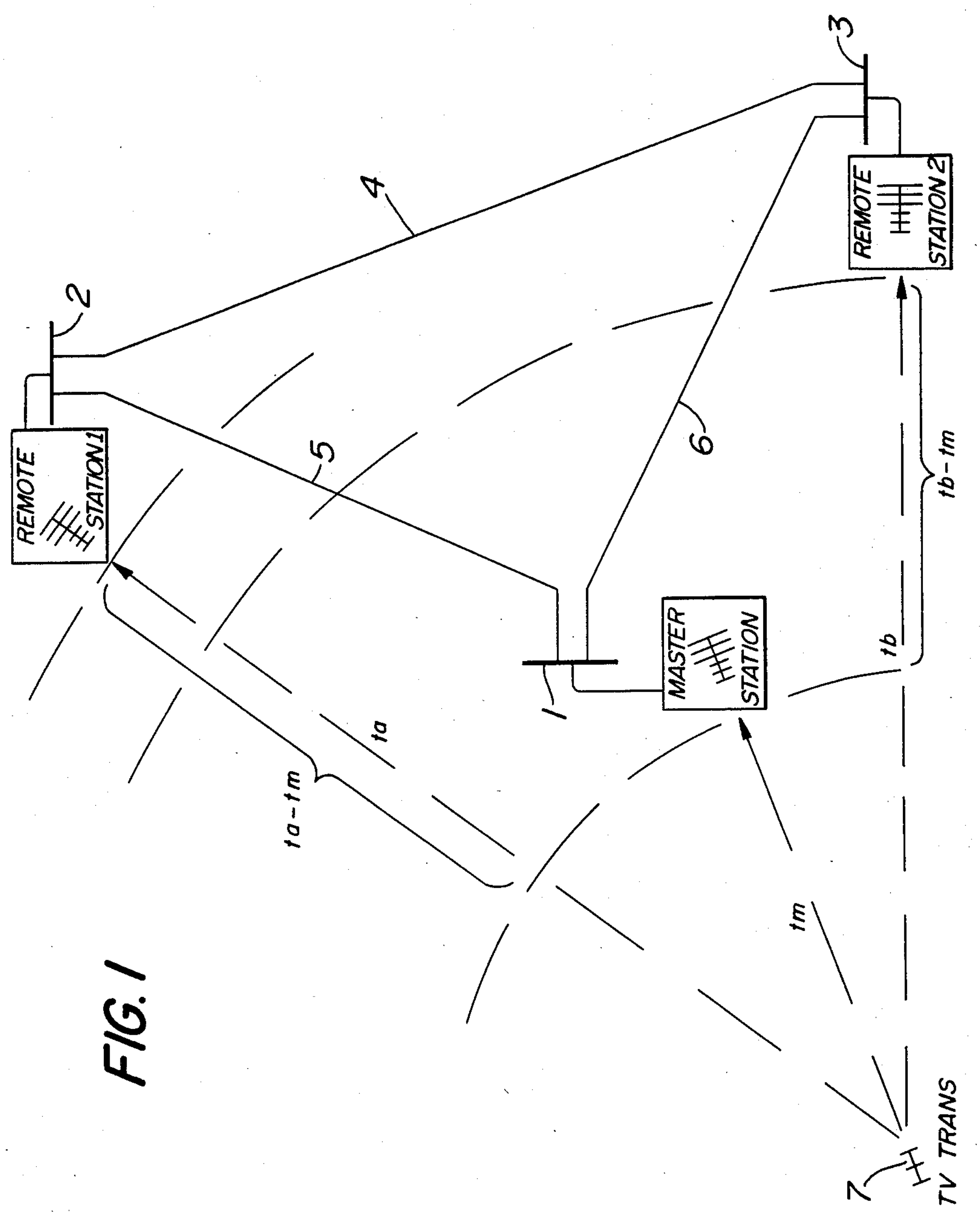
FIG. 1 is a plan view showing a power distribution system and a source of TV signals.

FIG. 1 shows, by way of example, a plan view of a power distribution system having three stations which are interconnected for the distribution of the electrical power generated at those stations. Thus, one station, shown as the master station, may generate power for supply to the bus 1 and the other stations, shown as remote station 1 and remote station 2, may generate power to the buses 2 and 3, respectively. The interconnecting transmission lines 4, 5 and 6 connect the buses together for interchange of power between the stations in order to efficiently supply their loads (not shown).

In interconnected power systems it is useful to be able to determine the time when certain events on the system occurred with respect to other events. Such events may include circuit breaker closings, for example. In the case of a system breakdown it may be desireable to identify which breaker tripped first when the breakers themselves are associated with different stations and therefore with different remote elements of the data acquisition system provided. In such a breakdown, therefore, it will be necessary to time tag the events in accordance with a single time frame in order to be able to determine which breaker tripped first if the tripping sequence was a rapid one.

As previously mentioned this problem is frequently solved by using highly accurate clocks at the master and each of the remote stations which are synchronized by a single synchronizing signal broadcast to all of the stations. These highly accurate clocks, however, are very expensive, and it is desirable to use less accurate instruments when possible. It is also desirable to be able to increase the accuracy of the timing to a point where the accuracy of the timing method is sufficient to make it useful for the measurement of certain quantities in the system which have heretofore required special instruments for their measurement. Two such quantities are the voltage phase angles and the distance to a fault, as mentioned above.

In order to accurately determine the sequence of a number of events occurring at widely spaced points in a power distribution system a digital data acquisition system can be used. Such a system would normally be computer directed at the master station and would have computer circuits at each remote station for recording the event information including the time tagging of the events by reference to the remote station clock. In view of the inaccuracies of the clocks at the remote stations, it is necessary to refer the remote station clock times to a common standard. Such a common signal which is readily available for providing a common reference for the time tags is the line 10 synch signal available in all television transmissions. Thus, the arrival time of the line 10 synch signal at each of the remote stations can be used as a benchmark for the time tags associated with the events of interest. In this connection there is provided at each remote station and at the master station a television receiver for receiving the transmissions from a common television transmitter, identified as 7 in the figure.

To use the method of this invention, it is necessary to produce at each remote station both a signal representing the time when the event of interest occurred and the time when a line 10 synch signal, such as the one just preceding the event, arrived at the remote station where the event is being recorded. Both of those times are taken in reference to the clock at the remote station. It is also necessary to maintain at the master station a list of line 10 synch times by reference to the master clock. That list covers a predetermined period prior to the most recent line 10 synch signal. Such a list, sometimes known as a barrel, is maintained in the computer of the master station. It has a fixed length and is constantly updated with the oldest entry being discarded.

In order to determine the time by the master clock, Tm(E)(n), when an event occurred from information as to the time by the remote clock, Tr(E)(n), when the event occurred, the present invention determines a time correction factor, TCF(n), for the interrogation period "n" by finding the difference between the remote clock time, Tr(S)(n), for that line 10 synch pulse arriving at the remote station just prior to the event, and the master clock time, Tm(S)(n), for the same line 10 synch pulse arrival at the master station. A correction factor for the differences in the propagation time from the TV transmitter to the master as compared to the propagation time to the pertinent remote station receiver is introduced as Td. The equation for relating these values can be conveniently expressed as follows:

$$TCF(n) = Tm(S)(n) - Tr(S)(n) - Td, \text{ and} \quad (1)$$

$$Tm(E)(n) = Tr(E)(n) + TCF(n) \quad (2)$$

when, as shown in the figure, Td is calculated initially as (ta−tm) or (tb−tm), depending on the remote station involved. The time ta is the propagation time from the transmitter 7 to Remote Station 1, and time tb is the propagation time from the transmitter 7 to Remote Station 2, while time tm is the propagation time between the transmitter 7 and the Master Station.

As previously stated, the values for Tr(E)(n) and Tr(S)(n) are sent from the remote stations to the master in the reply messages sent in response to an inquiry as to the occurrence of any events of interest.

The value of Td is determined initially at system startup and is stored in the computer at the master station. It is thus only necessary to determine the value of Tm(S)(n) for the same line 10 synch as that identified by the remote. One way of obtaining this value would be to store the last value for the time correction factor, TCF(n−1), and use it in determining the value for the present time correction value, TCF(n). This can be done by selecting from the list at the master station the value of Tm(S)(n) which will cause the absolute value of the difference between the resulting TCF(n) and TCF(n−1) to be a minimum compared to the result obtained from calculation with the other line 10 synch times on the list. Thus.

$$|TCF(n) - TCF(n-1)| \text{ is min.} \quad (3)$$

Figure 2:
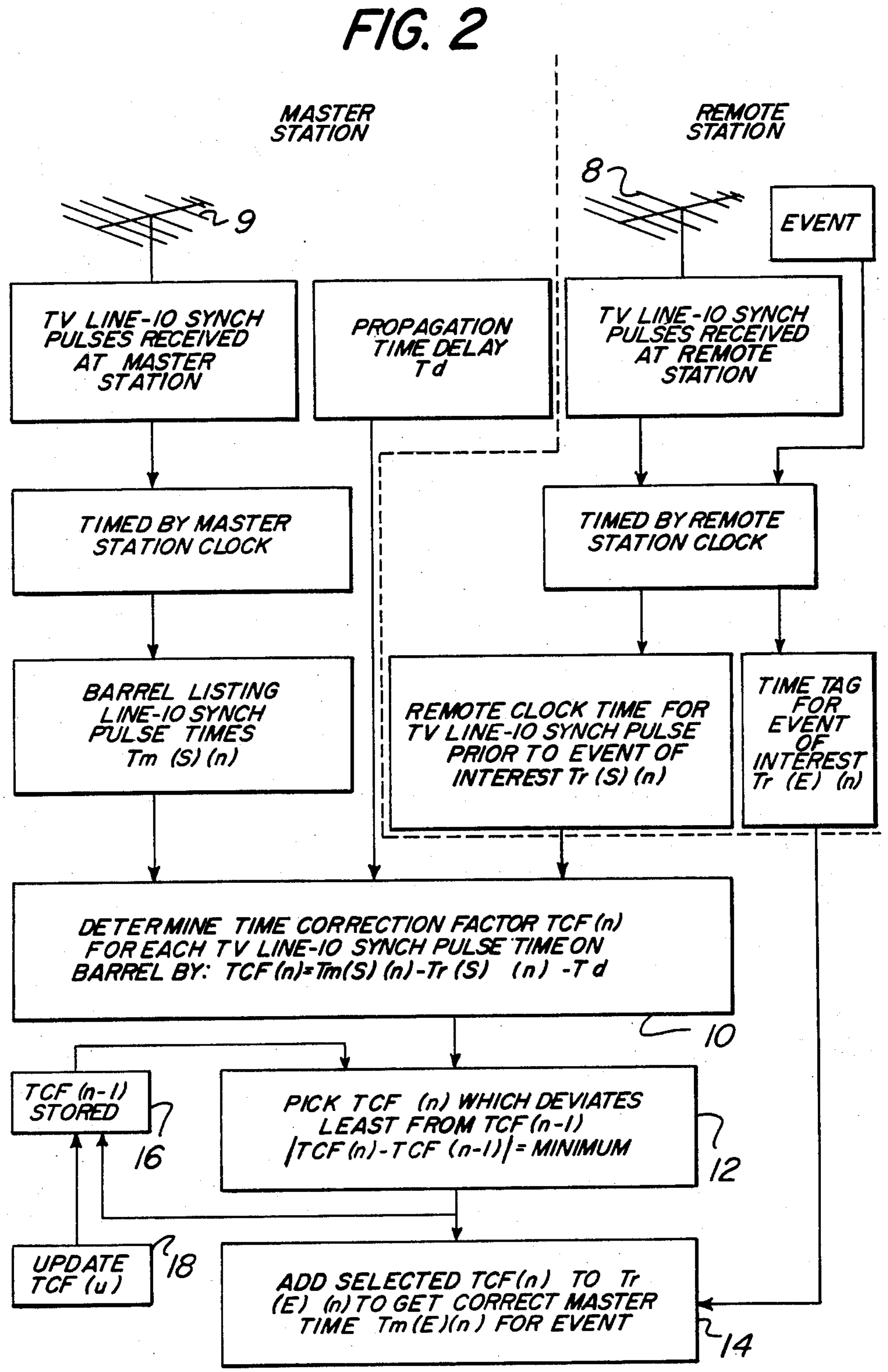
FIG. 2 is a block diagram of the method of the present invention.

FIG. 2 shows the above mentioned steps of the method of this invention. As shown, the remote stations (of which only one is shown) and the master station receive a television signal on antennas 8 and 9 from the same source and each station times the TV line 10 synch pulses detected from the common signal by use of its own clock so that the times associated with the synch pusles will be different for each station. For the master station a list of the line 10 synch pulses times, as determined from the master clock, is stored on a barrel at the master station. The line 10 synch pulse timings at the remote stations, which relate to the line 10 pulse occurring just before the time of occurrence of the events of interest, as timed from the station clock, are transmitted to the master station where they are used in step 10 with the pulse times from the barrel and the propagation time delay to determine the time correction factors associated with the barrel listings. As shown, in step 12 the particular time correction factor associated with the barrel listing which corresponds to the same line 10 whose timing is received from the remote station is selected for use in the subsequent step 14. In step 14 the correction factor selected is then added to timing of the event, as transmitted from the remote station, to give the correct time, by the master clock, for the event. As shown, the calculations in step 12 involve the use of the previously determined time correction factor, as supplied from a storage element 16, which is constantly update from the time correction factor determined by step 12 and less frequently updated by the updated signal supplied by the update method represented by block 18.

This method assumes that the system is able to make an initial identification of the line 10 synch pulse received by the master station which corresponds to a certain line 10 synch pulse received at any remote station. To accomplish this identification and also since the clocks in the system will be running at different speeds eventually causing a drift which exceeds the time between line 10 synch pulses (33 ms), it is necessary to have a method for making a periodic update of the value of TCF(n) or the value of TCF(n−1) as it is used in the calculation in equation (3). Thus, it is necessary to calculate a value for TCF(n−1), for example, in another way which is independent of the line 10 synch times, for the method described so far only allows one to pick the appropriate line 10 synch pulse at the master if the drift since the last update does not exceed 33 ms. Since a basic 8 ppm clock will only produce a 267 ns error over a 33 ms interval, it will take over an hour for the clock to drift sufficiently to produce an ambiguity in the identification of line 10. Therefore, in using a clock with that accuracy it would be necessary to go through an update procedure at least once an hour. A suitable method for updating may, for example, be that which is disclosed in the above mentioned patent applications of my coworkers. In that connection the disclosure of application Ser. No. 301,350 now U.S. Pat. No. 4,473,889 incorporated herein by reference.

In determining with such a method the time correction factor in a update period u, namely TCF(u), which can be substituted for the value of TCF(n−1) in equation (3), it is necessary to use quantities which, as mentioned above, avoid reference to line 10 synch pulses. A first quantity which is necessary is the time Tm(O)(u), which is the time by reference to the master clock of transmission of the last bit of the interrogatory message sent by the master to a remote requesting time of events data. As a result of the data request the remote will reply giving the time data relating to the events of interest as they have been stored at the remote.

In addition to the event time Tr(E)(u), if an event is to be timed during the update period, the remote sends TPTM(u), the "request to send"-"clear to send" (turnaround) delay time, namely that time required after receipt of a request to start transmitting a reply. Another time sent back by the remote is Tr(X)(u), the time as established by the remote clock when the last bit of the interrogatory message has been received.

The master station must record Tm(Y)(u), the time of receipt of the first part of the reply message from the remote. With this information and the time values from the remote, the master can calculate the time correction factor TCF(u) in accordance with the following formula:

$$TCF(u)=\tfrac{1}{2}[Tm(O)(u)+Tm(Y)(u)-TPTM(u)-M]-Tr(X)(u). \quad (4)$$

The time M, indicative of the length of the message, may be zero when all time measurements are made with relationship to the same bit position in the message structure or when the accuracy required is such that M is small by comparison to the other values in the calculation.

The calculation in equation (4) does not take into account the drift of the clocks, which is an important factor. This drift is the result of the clocks operating at slightly different frequencies and can be taken into account by calculation in accordance with the following equation, which utilizes TCF(u) as calculated by equation (4):

$$TCF(u)'=TCF(u)-DR(u)'[Tr(X)(u)-Tr(E)(u)]. \quad (5)$$

DR(u)' is the updated drift rate calculated in accordance with the equation:

$$DR(u)'=DR(u-1)'+W[DR(u)-DR(u-1)]. \quad (6)$$

(u−1) is the previous update period and W is a weighting factor, which may be less than 1 if it is desired to lag the calculation for oscillating factors causing drift, such as temperature. The drift rate DR(u) is calculated in accordance with the equation:

$$DR(u)=[TCF(u)-TCF(u-1)]/[Tr(X)(u)-Tr(X)(u-1)]. \quad (7)$$

The weighting factor W may be 1 if there are no sources of drift which vary randomly and thus require a lagged correction. Thus, if the only source of drift is the different frequencies at which the clocks work, then W is 1 and Dr(u)' = DR(u).

The method of this invention may be used for the purpose of measuring the voltage phase angle between two buses, such as buses 2 and 3, for example. To make this measurement it is necessary to measure the time for identical zero crossings of the voltage waveform at bus 3 and also at bus 2. Both of those time measurements then must be referred to a common time frame in order to have the needed accuracy. Thus, if the time measurement of a zero crossing at a first location (bus 2), Tr(E)(n), is made by reference to an unsynchronized clock at station 1 and the same zero crossing is measured at another location (bus 3) by reference to another unsynchronized clock at station 2, then the difference between those times can be calculated by transposing Tr(E)(n) to the time frame of the clock at station 2, or as would normally be the case, both times can be transposed to the time frame of the master station. Thus, the time of the zero crossing at station 2, when it has been transposed to the time frame of the master station, Tm(E)(n)', would be subtracted from Tm(E)(n), the time Tr(E)(n) after transposition to the time frame of the master station clock. The time difference thus determined is, of course, a measure of the phase difference and is directly convertible to the phase difference in degrees.

As has been stated, the accurate time measurement method of this invention can also be used advantageously to measure the distance to a line fault. Thus, if there is a fault in the line 4 between buses 2 and 3, the arrival time for the large change in current which would result from that fault can be timed at both buses. When the wave front arrives at bus 2 the time Tr(E)(n) is measured and that measurement can be compared to the time of arrival of the wave front at bus 3. Since the two measurements will be made with different clocks, it is necessary to transpose those measurements to a common time frame, such as the master station clock. This can be done in the same way as mentioned above for the measurement of the voltage phase angle or for the time ordering of a number of events. The difference between the two measurements after transposition will give the additional distance to the bus farthest from the fault over the distance to the bus nearest the fault. Then knowing the distance between the two buses the distance to the fault can be determined from either bus.

Apparatus, as required to carry out the calculations and measurements mentioned above, can advantageously be of the type described in the referenced application with the line 10 synch pulses being received by equipment of the type disclosed in NBS TECHNICAL NOTE 695, issued May 1977, on page 143, as FIG. 8.8. The inputs to the system from the line 10 synch circuits can be by way of the Point Processor Control unit 72 of the referenced application FIG. 3.

What is claimed is:

1. A method for correlating time tags associated with events of interest detected at any of a plurality of remote stations in a digital data acquisition system having a master station connected to receive data from said plurality of remote stations where said time tags represent the data gathered at the remote stations indicating the time of occurrence of each of said events as obtained by reference to an unsynchronized clock at the remote station detecting the occurrence of the event and the correlation is to time as kept by a clock at the master station, to make possible a time ordering of events at different remote stations, comprising the steps of:

maintaining at said master station a list of line 10 synch pulse times from a single television station as determined from the master clock for a predetermined number of line 10 synch pulses previous to the last most recent line 10 synch pulse received;

transmitting at each of a sequence of interrogatory periods (n) and periodic update periods (u) from said master to said remote stations message requesting information on time tagged events at said remote stations;

producing and transmitting to said master during said interrogatory periods (n) at each remote station in response to said messages a signal constituting a reply message incorporating as a first signal the time tags, Tr(E)(n), for the events information requested, and as a second signal the line 10 synch times at the remote stations, Tr(S)(n), for the line 10 synch pulse previous to each of the events;

producing at said master station a third signal, Td, representative of the difference in propagation time from the TV transmitter to the remote station as compared with the master station;

producing at each interrogatory period at said master station a time correction factor, TCF(n), as a function of said second and third signals in accordance with the equation $$TCF(n)=Tm(S)(n)-Tr(S)(n)-Td,$$

where Tm(S)(n) is the time established from said list for the line 10 synch pulse identified by the signal Tr(S)(n), said time Tm(S)(n) being identified on said list as that one which causes the resulting correction factor, TCF(n), to deviate from the previous correction factor, TCF(n−1), by a minimum as compared with the correction factors corresponding to the other times on said list;

periodically updating the said previous correction factor, TCF(n−1) used to obtain the value of the present correction factor, TCF(n), to compensate for the drift of the clocks at the remote stations with reference to the master station;

summing for each event said time correction factor and the first signal, representing the time tag Tr(E)(n), to produce a signal representing the correct timing of the events with reference to the master clock; and recording said correct timing signal for each event to provide a basis for time ordering a sequence of events occurring at different remote stations.

2. A method for accurately determining the time of an event of interest occurring at a first location with reference to the time frame of a clock at a second location when the time of occurrence of said event is initially measured by reference to an unsynchronized clock at the first location, comprising the steps of:

maintaining at the second location a list of the times of reception at the second location of the television line 10 synch pulses from a certain television station as determined with reference to the clock at said second location for a predetermined number of line 10 synch pulse previous to the most recent line 10 synch pulse received;

producing during a period (n) at said first location a transmission to said second location incorporating as a first signal a time tag, Tr(E)(n), for the event of interest in that period, and as a second signal the line 10 synch time, Tr(S)(n), at the first location for a line 10 sych pulse adjacent in time to said event;

producing at said second location a third signal, Td, representative of the difference in propagation time of the television signal from the transmitter of said certain station to the first location as compared with the propagation time to the second location;

producing at each period at said second location a time correction factor, TCF(n), as a function of said second and third signals in accordance with the equation $$TCF(n)=Tm(S)(n)-Tr(S)(n)-Td$$

where Tm(S)(n) is the time established from said list for the line 10 synch pulse identified by the signal Tr(S)(n), said time TM(S)(n) being identified from said list as that one which causes the resulting correction factor, TCF(n), to deviate from the previous correction factor, TCF(n−1), by a minimum as compared with the correction factors corresponding to the other times on said list;

periodically updating the correction factor, TCF(n), to compensate for the drift of the clock at the first location with respect to the clock at the second location;

summing for each event said time correction factor and said first signal, representing the time tag Tr(E)(n), to produce a signal representing the correct time of the event with reference to the clock at said second location whereby the time of the event with reference to the time frame of a clock at the second location is determined.

3. A method for accurately determining the voltage phase angle between a first and second location in an electrical load distribution system in which the clocks available in said first and second locations are unsynchronized, comprising the steps of:

maintaining a list of the reception times for television line 10 synch pulses from a certain television station as determined with reference to the clock at said second location for a predetermined number of line 10 synch pulses previous to the most recent line 10 synch pulse received;

producing at said first location in the period (n) a first signal indicative of a time, Tr(E)(n), with reference to the clock at said first location for the occurrence of a zero crossing of the line voltage as the event of interest at that location, and as a second signal the line 10 synch time, Tr(S)(n), at the first location for a line 10 synch pulse adjacent in time to said zero crossing;

producing a third signal, Td, representative of the difference in propagation time of the television signal from the transmitter of said certain station to the first location as compared with the second location;

producing a time correction factor, TCF(n), at said second location as a function of said second and third signals in accordance with the equation $$TCF(n)=Tm(S)(n)-Tr(S)(n)-Td$$

where Tm(S)(n) is the time established from said list for the line 10 synch pulse identified by the signal Tr(S)(n), said time Tm(S)(n) being identified on said list as that one which causes the resulting correction factor, TCF(n), to deviate from the previous correction factor, TCF(n−1), by a minimum as compared with the correction factors corresponding to the other times on said list;

periodically updating the correction factor, TCF(n), to compensate for the drift of the clock at the first location with reference to the clock at the second location;

summing for said zero crossing the time correction factor and said first signal, to produce a signal Tm(E)(n) representing the time of the zero crossing at said first location with reference to the clock at said second location;

producing a signal, Tm(E)(n)′, representing the time with reference to the clock at said second location when the same zero crossing of the line voltage as another event of interest occurs at a location other than the first location; and determining the difference between said signals Tm(E)(n) and Tm(E)(n)′ as an accurate measure of the phase angle of the voltage between said first and said other locations.

4. A method for accurately determining the distance to a fault on a line between a first and second location in an electrical load distribution system in which the clocks available in said first and second locations are unsynchronized, comprising the steps of:

maintaining a list of the reception times at the second location of the television 10 synch pulses from a certain television station as determined with reference to the clock at said second location for a predetermined number of line 10 synch pulses previous to the most recent line 10 synch pulse received;

producing at said first location in the period (n) a first signal indicative of a time, Tr(E)(n), with reference to the clock at said first location for the occurrence of an excessive change in line current as an event of interest at said first location indicative of a line fault, and as a second signal the line 10 synch time, Tr(S)(n), at the first location for a line 10 sych pulse adjacent in time to said current change;

producing a third signal, Td, representative of the difference in propagation time of the television signal from the transmitter of said certain station to the first location as compared with the propagation time to the second location;

producing a time correction factor, TCF(n) , as a function of said second and third signals in accordance with the equation $$TCF(n)=Tm(S)(n)-Tr(S)(n)-Td$$

where Tm(S)(n) is the time established from said list for the line 10 synch pulse identified by the signal Tr(S)(n), said time Tm(S)(n) being identified on said list as that reception time which causes the resulting correction factor, TCF(n), to deviate from the previous correction factor, TCF(n−1), by a minimum as compared with the correction factors corresponding to the other times on said list;

periodically updating the correction factor, TCF(n), to compensate for the drift of the clock at the first location with reference to the clock at the second location;

summing for said excessive change in line current the time correction factor and said first signal, to produce a signal, Tm(E)(n), representing the time of the change in current at said first location with reference to the clock at said second location;

producing a signal, Tm(E)(n)′, representing the time with reference to the clock at said second location when the corresponding change in current as another event of interest occurs at a location other than the first location; and determining the relationship between said signals Tm(E)(n) and Tm(E)(n)′ as a measure of the distance from said first or said other location to the fault.

5. The method of claims 1, 2, 3, or 4 in which the updating of the correction factor, TCF(n), for each event of interest includes the steps of;

storing a fourth signal representing the clock time, Tm(O)(u), at said second location when an interrogatory message for an update period (u) is sent from the second location to said first location requesting information as to the time of an event of interest;

producing during said update period at the interrogated first location a fifth signal representing the clock time, Tr(X)(u), at said first location when the interrogatory message for the update period was received at the first location;

producing at said first location a sixth signal which constitutes a reply message incorporating the time, Tr(E)(u), measured as the time of the event of interest, and the time Tr(X)(u);

storing for each update period a seventh signal representing the clock time at the second location, Tm(Y), when the end of the reply message is received at the second location;

combining said forth, fifth and seventh signals to produce an eighth signal representing a time correction factor, TCF(u), for the period (u), said combination being in accordance with the equation $$TCF(u)=\tfrac{1}{2}[Tm(O)(u)+Tm(Y)(u)-TPTM(u)-M]-Tr(X)(u)$$

where TPTM is the delay time at said first location and M is that length of the message sent to said second location which exceeds the length of the interrogatory message sent to the first location; and modifying said eighth signal to produce a ninth signal, TCF'(u), representing an updated time correction factor with correction for the drift rate of the clock in the first location as compared with the clock in the second location, said modification being in accordance with the equation, $$TCF'(u)=TCF(u)-DR(u)[Tr(X)(u)-Tr(E)(u)],$$

where Tr(E)(u) is the time of occurrence of the event of interest, and Dr(u), the drift rate, is calculated in accordance with the equation, $$DR(u)=[TCF(u)-TCF(u-1)]/[Tr(X)(u)-Tr(X)(u-1)].$$

* * * * *